(12) United States Patent
Iwatschenko-Borho et al.

(10) Patent No.: US 7,456,405 B1
(45) Date of Patent: Nov. 25, 2008

(54) PORTABLE RADIATION MONITOR METHODS AND APPARATUS

(75) Inventors: Michael Iwatschenko-Borho, Erlangen (DE); Norbert Trost, Erlangen (DE); Ralf Pijahn, Erlangen (DE)

(73) Assignee: Thermo Fisher Scientific Inc., Waltham, MA (US)

( * ) Notice: Subject to any disclaimer, the term of this patent is extended or adjusted under 35 U.S.C. 154(b) by 254 days.

(21) Appl. No.: 11/076,409

(22) Filed: Mar. 8, 2005

Related U.S. Application Data (60) Provisional application No. 60/551,099, filed on Mar. 8, 2004.

(51) Int. Cl.
  *G01J 5/02* (2006.01)
  *G01T 1/02* (2006.01)
(52) U.S. Cl. .............................. 250/339.02; 250/370.07
(58) Field of Classification Search ............ 250/339.02, 250/370.07, 370.11, 484.5
  See application file for complete search history.

(56) References Cited

U.S. PATENT DOCUMENTS

| | | | | |
|---|---|---|---|---|
| 3,609,734 A * | 9/1971 | Svansson | ..................... | 340/527 |
| 3,721,824 A * | 3/1973 | Bristol | ........................ | 250/369 |
| 4,266,126 A * | 5/1981 | Mills, Jr. | ..................... | 250/264 |
| 4,642,463 A * | 2/1987 | Thoms | ..................... | 250/336.1 |
| 5,124,936 A * | 6/1992 | Pelletier et al. | ........ | 250/370.02 |
| 5,258,926 A * | 11/1993 | Duftschmid et al. | ........ | 250/375 |
| 7,026,627 B2 * | 4/2006 | Fowler et al. | ................ | 250/394 |
| 2003/0212302 A1 * | 11/2003 | Rozenfeld et al. | ............... | 600/1 |
| 2003/0213917 A1 * | 11/2003 | Menlove et al. | ........ | 250/390.01 |
| 2005/0258373 A1 * | 11/2005 | Lacy | ..................... | 250/390.01 |
| 2006/0208154 A1 * | 9/2006 | Hughes et al. | ........... | 250/208.1 |

OTHER PUBLICATIONS

Mahoud, Imbaby I., "Wide-Range Portable Dosimiter Based on Microcontroller" Feb. 24-26, 1998, Fifteenth National Radio Science Conference.*

* cited by examiner

*Primary Examiner*—David P. Porta
*Assistant Examiner*—Carolyn Igyarto
(74) *Attorney, Agent, or Firm*—Chapin IP Law, LLC; Barry W. Chapin, Esq.

(57) ABSTRACT

A radiation measuring instrument implements an energy ratio technique that utilizes a ratio between a measured radiation count rate and a detected radiation dose rate to determine if an alarm should be signalled to an operator of the device of this invention. The radiation measuring instrument uses an "inorganic" scintillation or radiation detection material, such as a Thallium doped sodium iodide (NaI(TI)) material, which operates in relatively compact or small sizes to detect radiation. The radiation measuring instrument also uses a ratio of two measured parameters to detect gamma radiation from artificial (hidden) radioactive material where the parameters include (i.) a total number of counted or detected gamma particles and (ii.) a measured, detected, or otherwise derived gamma dose rate.

24 Claims, 4 Drawing Sheets

PORTABLE RADIATION MONITOR METHODS AND APPARATUS

RELATED APPLICATIONS

This application claims benefit of U.S. Provisional Application Ser. No. 60/551,099 filed Mar. 8, 2004, the entire teachings of which are incorporated herein by reference.

FIELD OF THE INVENTION

Embodiments of the invention relate to radiation detection systems and, more specifically, to a small portable high sensitivity radiation measuring device for the detection of radioactive material.

BACKGROUND

United States Homeland security requirements set forth a need for devices capable of sensitive detection of gamma rays originating from hidden radioactive material (e. g. ANSI N42.32). Commercially available high sensitivity portable or mobile gamma radiation meters can quickly detect small increases in the strength of a gamma radiation field. Some of these conventional radiation detection instruments simply display the number of detected gamma rays sensed (i.e., counted) by the device, while other conventional radiation detection devices are capable of measuring and displaying the dose rate of the gamma radiation field detected by the device. Operators of such device can set alarm thresholds on absolute numbers of the detected particles per time unit or on the measured dose rate, depending upon the device used. Alternatively, some conventional radiation detection systems are the increase of one of these quantities (gamma count or dose rate) compared to a learned background level of radiation in order to generate an alarm when the count or dose rate exceeds a predetermined threshold.

SUMMARY

Since the natural radiation level of the environment (i.e., natural background radiation) can vary by at least an order of magnitude from one location to another, simple conventional radiation particle counting or dose rate measurement instruments often indicate significant increases on the radiation level and generate false alarms quite frequently during mobile applications. However, with such conventional devices, a user does not know whether the increase in radiation that cause the alarm is caused by a higher natural background radiation level that has occurred due to movement from one location to another, or if the alarm is caused by an artificial radiation source, such as hidden radioactive material that the user is approaching or passing by (and that should be detected).

One technique to overcome this deficiency would be to perform an analysis of the energy spectrum or radiation fingerprint of the radiation source by means of a conventional gamma spectroscopic detector. This allows an operator of the spectroscopic detector to identify a particular source of radiation (e.g., what element or elements are producing the radiation). However, performing radiation detection by using an alarm from a conventional radiation detection instrument (that detects only count or dose rate) followed by the use of a spectrographic analysis on the radiation requires more expensive and heavier (i.e., less portable) instrumentation which may not be at hand and may require a significant amount of measuring time to obtain an accurate spectrograph as long as low levels of radiation are involved. Accordingly, accurate detection of radiation sources using conventional detectors is a slow and cumbersome process since, depending upon the application, each alarm, whether false or not, must be tested thereafter using the spectrographic analysis equipment.

Other types of conventional radiation detection systems exist that operate using a comparison of natural background radiation levels. Such instruments provide a quick yes/no answer regarding the question of whether artificial radiation is present or not. Such instruments use a rather constant measurement or ratio of detected high and low energy gamma radiation for natural radioactivity as a corresponding indicator of the presence of artificial radiation. Artificial radiation sources that are intended to be detected (e.g., via use of a radiation detection device), known as "special nuclear material" (SNM), show predominantly low energy gamma radiation that is less than 185 keV for U-235 and less than 400 keV for Pu-235. One disadvantage of conventional natural background radiation based radiation detection instruments that use the natural background radiation detection technique is that they use scintillators (i.e., detection material) made of material that have rather large size and weight factors. As an example, conventional natural background radiation detectors require scintillation material that ranges in volume from 700 cubic centimeters to 5000 cubic centimeters. As such, they are relatively large (e.g., one liter or more in size) and cumbersome to use as portable devices.

Embodiments of the present invention are based in part on the observation that conventional portable radiation detection systems suffer a deficiency of producing false alarms due to variations in natural background radiation. The present radiation measuring instrument significantly overcomes limitations of conventional portable radiation detection systems such as those described and shown above and offers a convenient, simple and fast method to indicate the presence of artificial gamma radiation with a pocket size, low power instrument. Embodiments of the present radiation measuring instrument use an energy ratio technique that utilizes a ratio between a measured radiation count rate to a detected radiation dose rate to determine if an alarm should be signalled to an operator of the device of this invention. The present radiation measuring instrument uses an "inorganic" scintillation (i.e., radiation detection) material, such as Thallium doped sodium iodide material, which operates in relatively compact or small sizes (e.g., a cylindrical shape with area of 1 to 10 ccm) to detect radiation. The present radiation measuring instrument uses a ratio of two measured parameters to detect gamma radiation from artificial (hidden) radioactive material. The parameters are a) total number of detected gamma particles (count), and b) measured, detected or otherwise derived gamma dose rate.

In one arrangement a radiation measuring instrument includes a detector, energy analysis circuitry in electrical communication with the detector, and a controller in electrical communication with the energy analysis circuitry. The detector detects a presence of radiation particles relative to the radiation measuring instrument. The energy analysis circuitry has a plurality of counters configured to measure a plurality of radiation particle counts from the detector, each counter having a corresponding, distinct energy threshold level. The controller is configured to calculate a radiation dose rate based upon the radiation particle counts of the plurality of counters and compare the radiation dose rate with the radiation particle counts from one of the counters to generate an energy deviation result. The energy deviation result indicates a presence of artificial radiation when the energy deviation result approaches one of a first threshold value and a second threshold value defining a threshold value range, the first threshold value greater than the second threshold value. By using both the radiation dose rate and the radiation particle counts to calculate the energy deviation result, the radiation measuring instrument can detect a longer lasting presence of a weak radiation field and can detect a transient presence of significantly increased gamma flux.

BRIEF DESCRIPTION OF THE DRAWINGS

The foregoing and other objects, features and advantages of the methods and apparatus will be apparent from the following description of particular embodiments, as illustrated in the accompanying drawings in which like reference characters refer to the same parts throughout the different views. The drawings are not necessarily to scale, emphasis instead being placed upon illustrating the principles of the methods and apparatus.

DETAILED DESCRIPTION

The present radiation measuring instrument offers a convenient, simple and fast method to indicate the presence of artificial gamma radiation with a pocket size, low power instrument. Embodiments of the radiation measuring instrument use an energy ratio technique that utilizes a ratio between a measured radiation count rate to a detected radiation dose rate to determine if an alarm should be signalled to an operator of the device of this invention. The radiation measuring instrument uses an "inorganic" scintillation (i.e., radiation detection) material, such as Thallium doped sodium iodide NaI(TI) material, which operates in relatively compact or small sizes (e.g., a cylindrical shape with area of 1 to 10 ccm) to detect radiation. The radiation measuring instrument uses a ratio of two measured parameters to detect gamma radiation from artificial (hidden) radioactive material where the parameters include a total number of detected gamma particles or counts, and a measured, detected, or otherwise derived gamma dose rate.

The gamma radiation measuring instrument operates to survey these two different parameters (count and dose rate) simultaneously and compute the ratio between them (e.g., the energy deviation ratio) in order to cover two different scenarios during a search for hidden radioactive material. Those scenarios include: A) detecting a longer lasting presence of a weak radiation field and B) detecting a transient presence of significantly increased gamma flux.

In scenario A, the increase of the gamma flux due to a longer lasting presence of a weak radiation field may not be sufficient to trigger a net or absolute alarm based on dose rate or particle count alone. However, since the gamma radiation measuring instrument uses a ratio calculation between a dose rate and a detected particle count, the detected number of gamma particles may be significantly high enough compared to the measured dose rate and thus the ratio between these values can exceed a threshold and the gamma radiation measuring instrument can trigger an alarm. The calculation of the dose rate according to one arrangement of the gamma radiation measuring instrument uses multiple multiplier thresholds (i.e., energy analysis) that are applied to the measured count rate (wherein the particular multiplier is selected based on the threshold energy level) to derive a dose rate. In some instances, derivation of dose rate may require a longer measuring time than a gross counting algorithm. As an example, a typical response time for such an alarm indication can be, for example, within five to twenty second range, depending on the background radiation level and the scintillator (i.e., detector material) size.

In the scenario B above, due to the transient presence of significantly increased gamma flux, a significant increase of the detected gamma rays (typically >100% at background level) is detected within one or two seconds of time and a high count rate is thus detected. Such an increase can frequently happen during mobile applications due to variations of the natural background radiation level from one position to another. In such a case the user could, for example, stop, try to quickly find the location of maximum reading of particle counts and then, after a few seconds, an indication in the display would appear if the ratio of detected gammas to the total dose rate (derived from the gamma count rate in one embodiment) would be out of the acceptable range for natural radiation thus indicating an alarm.

Figure 1:
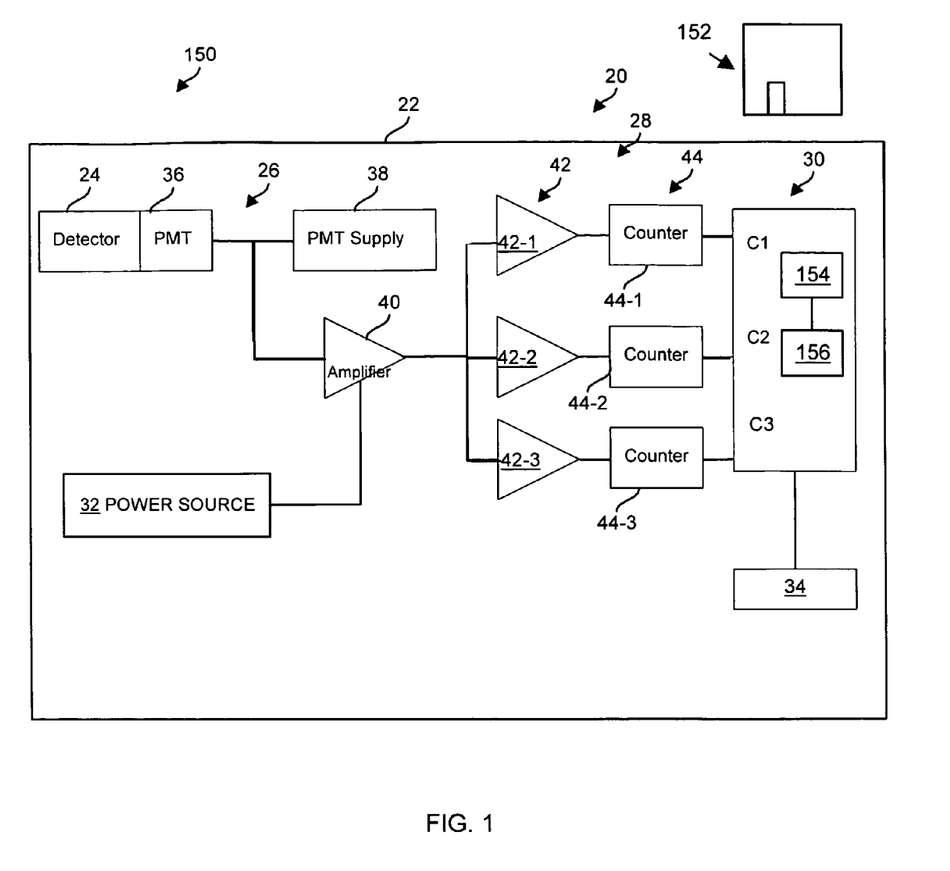
FIG. 1 illustrates a block diagram of a gamma radiation measuring instrument.

FIG. 1 illustrates a block diagram of an arrangement of a radiation measuring instrument 20, such as a gamma radiation measuring instrument. The gamma radiation measuring instrument 20 includes a housing 22 that carries a detector 24, a photomultiplier assembly 26, energy analysis circuitry 28, a controller 30, a power source 32, and a signal output 34.

The detector 24 includes an "inorganic" scintillation (i.e., radiation detection) material, such as sodium iodide NaI(TI) material. In one arrangement, the detector 24 is configured in a relatively compact or small size (e.g., a cylindrical shape with area of 1 to 10 ccm) and operates to detect radiation within a field. In another arrangement, the "inorganic" scintillation material of the detector 24 is formed of cesium idoide (CsI).

The photomultiplier assembly 26 includes a photomultiplier tube 36, a photomultiplier tube power supply 38, and an amplifier 40. The photomultiplier tube 36 optically couples to the detector 24 and electrically couples to the amplifier 40. The photomultiplier tube 36 operates to receive a light signal from the detector 24 (e.g., as caused by interaction of radiation with the NaI material of the detector 24), generate an electrical signal or electrical pulses proportional to the light signal (e.g., proportional to the intensity of the light signal) and transmit the output pulses to the amplifier 40. The amplifier 40, such as a linear amplifier, adjusts the pulse amplitude levels of the output pulses to allow for discrimination pulse amplitude levels.

The energy analysis circuitry 28 includes comparators 42 and counters 44 (e.g., counter 44-1, counter 44-2, and counter 44-3). For example, the gamma radiation measuring instrument 20 utilizes at least two comparators 42, each having a given threshold, to achieve energy discrimination of an energy source. Typical example values correspond to photon energies of 0 to 30 keV, 200 keV and 500 keV. Each comparator 42 includes a corresponding counter (e.g., pulse counter) 44.

The controller 30, such as a processor and a memory, electrically couples to the counters 44 and is configured to receive count rates read from the counters 44. For example, C1, C2, and C3 are the count rates read out from the respective counters 44-1, 44-2, 44-3, usually every second or in smaller intervals, for each energy threshold level (e.g., C1 is for counts of particles impacting the scintillators in the 0 to 30

KeV energy band, C2 is for counts of particles impacting the scintillators in the 30 to 200 KeV energy band, and C3 is for counts of particles impacting the scintillators in the 200 to 500 KeV energy band).

The controller 30 is configured to calculate the dose rate (e.g., energy independent dose rate), based upon the count rates, as: a *C1+b*C2+ . . . +n*CN. The values of a, b, c, . . . , n are multiples for each energy level threshold such as, for example, 2, 25, 50, 100, 200, etc. corresponding to each energy level threshold associated with each counter 44. In typical applications the dose rate value is filtered by digital RC-filters or sliding mean value filters associated with the controller 30.

The controller 30 is also configured to calculate an energy deviation ratio of a sample as a ratio between the count rate of a particular counter and the calculated dose rate. For example, the controller 30 calculates the energy deviation ratio as:

energy deviation ratio=C1/dose rate.

C1 is used in this example as the count of particles within the energy level or band of concern (e.g., a band having the lowest relative energy level), whereas counts reflected by C2 or C3 are for energy levels often associated with background radiation.

The power source 32 is configured to provide power to the amplifier 40 energy analysis circuitry 28 and controller 30. In one arrangement the power source 32 is a high voltage generator, such as a battery, that provides portability to the measuring instrument 20.

The signal output 34 is configured to provide an indication of the energy deviation ratio to a user, calculated by the controller 30. For example, in one arrangement, the signal output 34 is configured as a display that provides the calculated value of the energy deviation ratio to the user. In another arrangement, the signal output 34 is configured as a light emitting diode (LED), sound generator, or vibrator activated by the controller 30 to warn the user when the energy deviation ratio reaches a particular threshold value.

Figure 2:
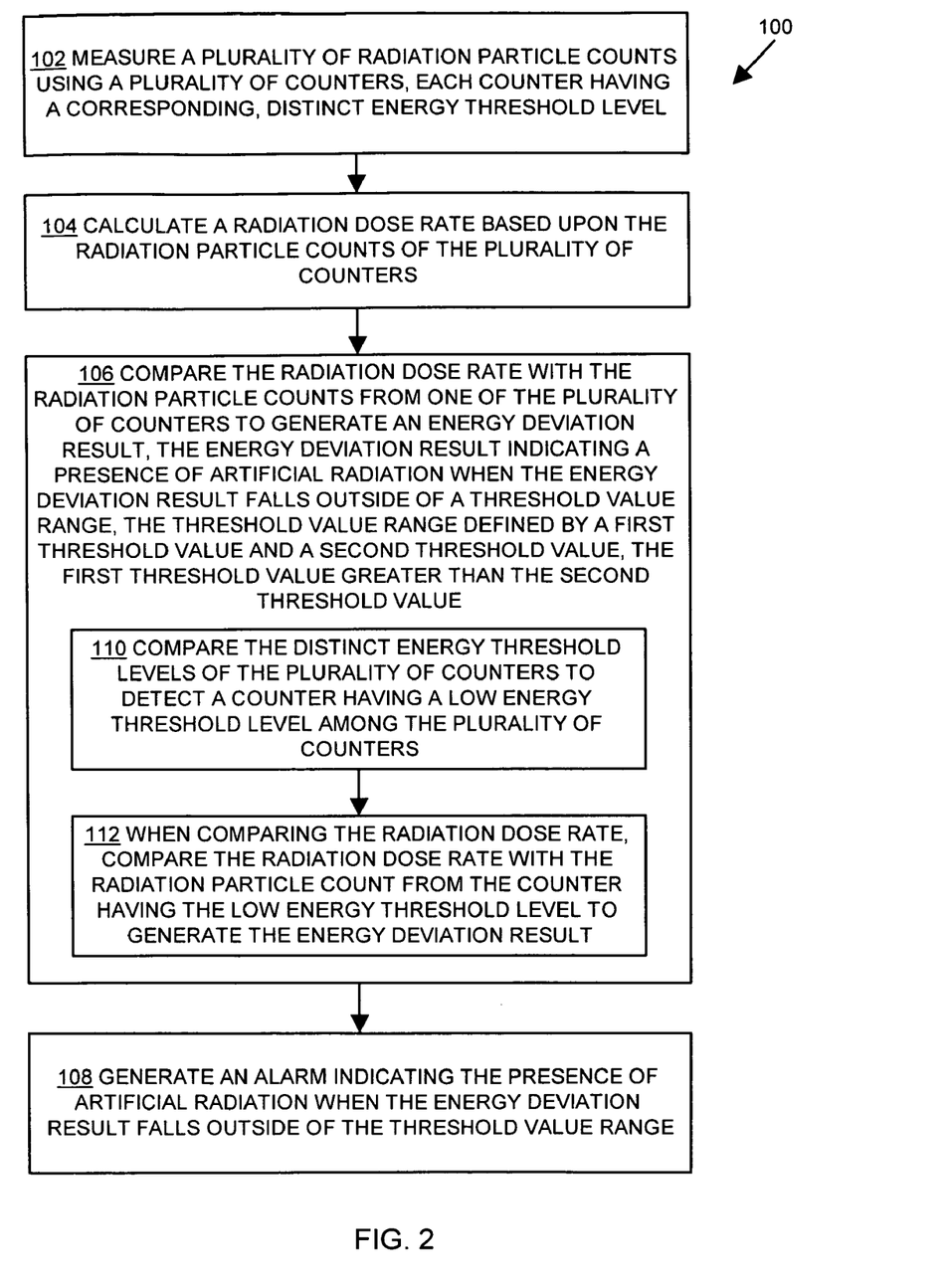
FIG. 2 illustrates a flow chart of a procedure performed by the gamma radiation measuring instrument.

FIG. 2 illustrates a flow chart 100 of a procedure performed by the gamma radiation measuring instrument 20. The gamma radiation measuring instrument 20 operates to detect a presence of artificial radiation within a sampling volume.

In step 102, the radiation measuring instrument 20 measures a plurality of radiation particle counts using a plurality of counters 44, each counter 44 having a corresponding, distinct energy threshold level. For example, the detector 24 and photomultiplier assembly 26 receive radiation particles within a given area or sample volume and transmit a resulting signal or pulse corresponding to the detected radiation particles to the energy analysis circuitry 28. The comparators 42 of the energy analysis circuitry 28 discriminates the energy levels of the signal received from the photomultiplier assembly 26. In one arrangement, where the radiation measuring instrument 20 includes three components 42-1, 42-2, 42-3, the first comparator 42-1 has a photon energy threshold of 30 keV, the second comparator 42-2 has a photon energy threshold of 200 keV, and the third comparator 42-3 has a photon energy threshold of 500 keV. In such a configuration, the first comparator 42-1 passes signals representing detected particles having an energy threshold of 30 keV to the first counter 44-1, the second comparator 42-2 passes signals representing detected particles having an energy threshold of 200 keV to the second counter 44-2, and the third comparator 42-3 passes signals representing detected particles having an energy threshold of 500 keV to the third counter 44-3.

In step 104, the radiation measuring instrument 20 calculates a radiation dose rate based upon the radiation particle counts of the plurality of counters 44. For example, the controller 30 utilizes the radiation measuring instrument 20 to sum radiation particle counts from the first counter 44-1, the second counter 44-2, and the third counter 44-3 to calculate the radiation dose rate. In one arrangement, the controller 30 sums weighted radiation particle counts from each of the counters 42 where weighting of the radiation particle is based upon the energy threshold level associated with each of the counters 44. For example, as indicated above, the counters 44-1, 44-2, and 44-3 produce respective count values C1, C2, and C3. During the calculation, the controller 30 "weighs" each of the count values with the energy level threshold associated with each counter 44:

a*C1+b*C2+c*C3 where the value 'a' is equal to the energy level threshold of the first counter 44-1 (e.g., 30 keV), the value 'b' is equal to the energy level threshold of the second counter 44-2 (e.g., 200 keV), and the value 'c' is equal to the energy level threshold of the third counter 44-3 (e.g., 500 keV).

In step 106, the radiation measuring instrument 20 compares the radiation dose rate with the radiation particle counts from one of the counters 44 to generate an energy deviation result. For example, the controller 30 forms a ratio of the radiation particle counts from one of the counters 44 with the calculated radiation dose rate to form the energy deviation result. The energy deviation result indicates a presence of artificial radiation when the energy deviation result falls outside of a threshold value range, the threshold value range defined by a first threshold value and a second threshold value, the first threshold value greater than the second threshold value.

Figure 3:
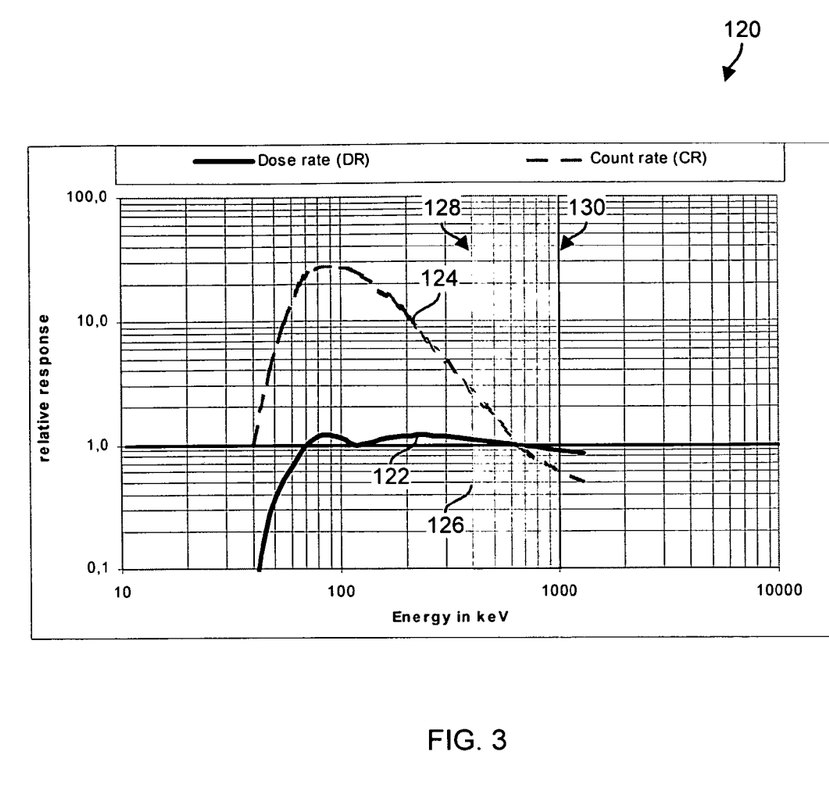
FIG. 3 illustrates a graph of the energy dependency of dose rate and count rate as monitored by the radiation measuring instrument.
Figure 4:
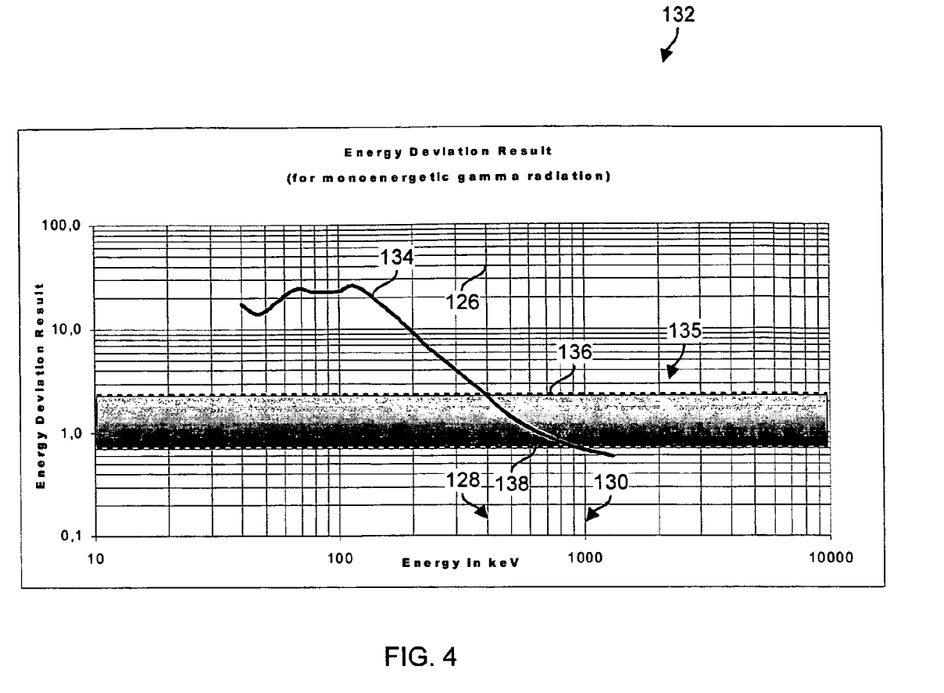
FIG. 4 illustrates a graph of an energy deviation result calculated as a ratio of the count rate to the dose rate shown in FIG. 3.

FIG. 3 shows a graph 120 of an example measurement of an energy dependency of dose rate 122 and a count rate 124 as monitored by the radiation measuring instrument 20. The graph 120 includes a shaded range 126 between 400 keV 128 and 1000 keV 130 representing the energy level range for naturally occurring radiation. FIG. 4 illustrates a resulting energy deviation result 134 calculated as a ratio of the count rate 124 to the dose rate 122 shown in FIG. 3 (e.g., the energy deviation ratio). FIG. 4 also illustrates an example threshold value range 135 for the energy deviation ratio. The threshold value range 135 represents an energy deviation result range, calculated as a ±percentage deviation from a reference energy deviation value (e.g., a value of a ratio of the radiation particle counts from one of the counters 44 with the calculated radiation dose rate in the absence of artificial radiation). The threshold value range 135 is defined by a first or upper threshold value 136, such as a value of 2.0, and by a second or lower threshold value 138, such as a value of 0.7 illustrated in FIG. 4. In one arrangement, when the energy deviation result 134 falls outside of the threshold value range 126, the energy deviation result 134 is either greater than the first threshold value 136 or is less than the second threshold value 138.

For example, FIG. 4 illustrates the energy level range for naturally occurring radiation 126 (e.g., between 400 keV 128 and 1000 keV 130). For the energy levels between approximately 400 keV and 1000 keV, the energy deviation result 134 remains within, or is constrained between, the first or upper threshold value 136 or 2.0 and the second or lower threshold value 138 of 0.7. When the energy deviation result 134 extends above the first threshold value 136 or falls below the lower threshold value 138, the energy deviation result 134 indicates the presence of radiation that is not compliant with natural radiation.

Based upon the ratio of the radiation particle counts from one of the counters 44 with the calculated radiation dose rate, for example, the radiation measuring instrument 20 can detect a lasting presence of a weak radiation field. As indicated above, an increase of the gamma flux due to a longer lasting presence of a weak radiation field may not be sufficient to trigger an alarm based on dose rate or particle count alone. However, since the gamma radiation measuring instrument 20 uses the ratio calculation between a dose rate and a detected particle count, the detected number of gamma particles may be significantly high enough compared to the measured dose rate. The ratio between the detected particle count and the detected number of gamma particles can exceed the first threshold value or can be less than the second threshold value, thereby causing the gamma radiation measuring instrument 20 to trigger an alarm.

Returning to FIG. 2, in step 108, the radiation measuring instrument 20 generates an alarm indicating the presence of artificial radiation when the energy deviation result falls outside of the threshold value range. For example, after the radiation measuring instrument 20 calculates the energy deviation result, as described above, the radiation measuring instrument 20 compares the energy deviation result to the first threshold value 136 and to the second threshold value 138 (e.g., such as stored in memory associated with the controller 30).

In the case where the energy deviation result exceeds the first threshold value 136, the radiation measuring instrument 20 generates an upper threshold alarm indicating the presence of artificial radiation and delivers the upper threshold alarm to the signal output 34 of the instrument 20. For example, in FIG. 4, when the energy deviation result 134 exceeds the first threshold value 136 of 2.0 (e.g., within energy level range for naturally occurring radiation 126), the radiation measuring instrument 20 generates the upper threshold alarm. Depending upon the configuration of the signal output 34, the upper threshold alarm causes the signal output 34 to produce a warning light (e.g., in the case where the signal output 34 is configured as an LED), a warning sound (e.g., in the case where the signal output 34 is configured as sound generator), or a warning vibration (e.g., in the case where the signal output 34 is configured as a vibrator). The upper threshold alarm indicates, to a user, the absence of a natural radiation field such as caused by the presence of an unshielded, relatively high gamma radiation source.

In the case where the energy deviation result is less than the second threshold value 130, the radiation measuring instrument 20 generates a lower threshold alarm indicating the presence of artificial radiation. For example, in FIG. 4, when the energy deviation result 134 falls below the second threshold value 138 of 0.8 (e.g., within energy level range for naturally occurring radiation 126), the radiation measuring instrument 20 generates the lower threshold alarm. Depending upon the configuration of the signal output 34, the lower threshold alarm causes the signal output 34 to produce a warning light (e.g., in the case where the signal output 34 is configured as an LED), a warning sound (e.g., in the case where the signal output 34 is configured as sound generator), or a warning vibration (e.g., in the case where the signal output 34 is configured as a vibrator). The lower threshold alarm indicates, to a user, an increase in radiation not caused by a natural radiation source. The lower threshold alarm warns the user as to the presence of medical isotopes or a shielded gamma radiation source, for example. FIG. 2 illustrates additional steps performed by the radiation measuring instrument 20 during operation when generating an energy deviation result.

For example, prior to generating the energy deviation result, the controller 30 selects a radiation particle count value from a particular counter 44 having an energy level or band of concern. In the presence of artificial radiation, the counter 44 having a relatively low energy level threshold measures an increase in a number of counts or "spikes" relative to the counters having the relatively higher energy level thresholds. Additionally, in the presence of naturally occurring radiation, all counters 44 associated with the radiation measuring instrument 20 measures a relatively similar increase in a number of counts relative to each other. If the counter 44 having the lower energy range produces a higher than expected count rate, by selecting a radiation particle count value from a particular counter 44 having a relatively low energy level threshold, such a count rate indicates the presence of artificial radiation relative to the radiation measuring instrument 20.

In step 110, the radiation measuring instrument 20 compares the distinct energy threshold levels of the counters 44 to detect a counter 44 having a low energy threshold level among the counters 44. For example, assume the radiation measuring instrument 20 includes three counters 44-1, 44-2, and 44-3. Further assume that the first counter 44-1 has an associated photon energy threshold of 30 keV, the second counter 44-2 has a photon energy threshold of 200 keV, and the third counter 44-3 has a photon energy threshold of 500 keV (e.g., the photon energy thresholds of the comparators 42-1, 42-2, 42-3 associated with the counters 44-1, 44-2, 44-3). In such a configuration, to detect the counter 44 having the low energy threshold level among the counters 44, the radiation measuring instrument 20 compares the photon energy thresholds of the counters 44. Based upon the example, the radiation measuring instrument 20 would detect that the first counter 44-1 has the low energy threshold level among the counters 44.

In step 112, when comparing the radiation dose rate, the radiation measuring instrument 20 compares the radiation dose rate with the radiation particle count from the counter 44 having the low energy threshold level to generate the energy deviation result. Assume the case where the radiation measuring instrument 20 encounters an artificial radiation field. By comparing the radiation dose rate with the radiation particle count from the low energy threshold counter 44, the counter 44 (e.g., the first counter 44-1 having an associated photon energy threshold of 30 keV) produces or counts a relatively large count rate. Such a count rate indicates the presence of artificial radiation relative to the radiation measuring instrument 20 and allows the radiation measuring instrument 20 to produce an alarm warning a user to the presence of artificial radiation.

FIG. 3 illustrates an example of the radiation measuring instrument 20 using the energy deviation ratio as an indicator for radiation not coming from NORM (Naturally Occurring Radioactive Material). FIG. 3 shows a graph 120 of an example measurement of the energy dependency of dose rate 122 and count rate (C1) 124 as monitored and compared using the ratio (the energy deviation ratio) calculation technique as described above. In FIG. 3, photon energies in the shaded range 126 between 400 keV and 1000 keV (e.g., the typical mean energy level range for natural radiation) could not be distinguished from NORM. In an alternative embodiments of the radiation measuring instrument 20, the radiation measuring instrument 20 distinguishes photon energies of particles having an energy greater than 400 keV by using additional comparators and counters 44 having larger energy thresholds (e.g., thresholds greater than 400 keV).

A conventional spectroscopy instrument uses power consuming DSP (Digital Signal Processors) or analog to digital conversion techniques with processing intensive mathematical algorithms that require microcontroller activity and therefore electrical power. These spectrometry instruments can identify specific types of radioactive nuclides. The radiation measuring instrument 20 provides a small instrument with battery lifetimes of several hundred hours. That is not feasible with conventional spectroscopy instruments. Embodiments of the radiation measuring instrument 20 provide very small NaI-detectors that behave more like plastic detectors (e.g., large detectors used in stationary natural background radiation based detection systems) in the high-energy range, while the system of the invention has superior detection capabilities in energy ranges less than 200 keV. As such, the radiation measuring instrument 20, using a NaI small scintillator, is optimal for detection of low energy gamma radiation and is quite accurate in energy ranges less than 200 keV.

In addition, conventional large natural background radiation detector systems that are often stationary do not use NaI based scintillation material since the large NaI-detectors are much more expensive than plastic detectors of same size (natural background radiation systems used plastic non-organic scintillators). In addition, the natural background radiation measurement for natural background is not so constant for larger sized NaI scintillators than for plastic scintillators since much more gamma quanta lose full energy in the crystal and thus the count rate ratios depend on details of the energy composition in the environment.

More specifically, embodiments of the radiation measuring instrument 20 provide the aforementioned portable gamma sensitive radiation meter that uses a detected radiation count rate and a derived dose rate to calculate the ratio of the total number of detected gamma particles and the measured dose rate as an indicator of the presence of artificial gamma sources. Dose rate can be inferred from count rate using energy thresholds or multipliers. As an example, in one embodiment the dose rate is derived from the same detector as the number of registered gamma rays using at least 2 different energy thresholds. The detector is a scintillator and may be composed of scintillation material such as NaI or another material. As an example, the detector 24 is configured as an inorganic scintillator with a high cross section for low energy gamma radiation. In one configuration, the detector 24 is a NaI(TI) detector coupled to a photomultiplier 36. The detector 24 can be, for example, a cylinder 10-15 mm diameter and 20-100 mm length.

http://www.fisica.unile.it/~demitri/didastuff/detlectures/SSL_PD_III.pdf The entire contents and teachings of this document are hereby incorporated by reference in their entirety.

Embodiments of the radiation measuring instrument 20 use unique ratio calculation algorithms suitable for pocket-sized natural background radiation detection compensation techniques while using small sized inorganic crystal scintillation materials such as NaI. One challenge for using the energy ratio technique in conjunction with small size inorganic scintillators is the problem that there are very few high-energy events registered by the NaI crystal that can serve as a reference measure of the ambient dose rate. Thus the ratio of the total number of registered gamma rays divided by the number of high energy events is subject to large statistical fluctuations at normal background radiation levels. However, for the pocket sized instrument of the radiation measuring instrument 20 using a small inorganic scintillator such as NaI, the number of registered gammas with an energy loss of more than a few keV is 100 times higher than the number of gammas with energy loss above 400 keV. This is quite different from the use of large size plastic scintillators for energy ratio-analysis (natural background radiation) where the corresponding ratio is about 20 times smaller.

As a result, embodiments of the radiation measuring instrument 20 provide a state-of-the-art approach to detecting radiation while discriminating from false alarm events caused by changes in natural background radiation. Such embodiments operate such that the number of counts per time unit is measured over a significantly shorter period of time (e.g., only a few seconds) and then the calculation of the dose rate, which is dominated by the very few high energy events, is thereafter derived from the count rate detected over this short time period using dose rate multiples that are applied to the count rate (multiplied) based on the energy level of the detected count, as shown in the aforementioned example computation. To allow the ratio derived from these two values to be suitable for an alarm indicator as described in this invention, the instrument is able to respond correctly to dose rate conditions which change as a function of time (for example when the portable instrument is passing a region of elevated radioactivity). Thus both the numerator and denominator of the ratio calculation must always refer to the same time interval.

Embodiments of radiation measuring instrument 20 thus operate to provide a solution by calculating the count rate ratio over variable time intervals (e.g., from 1 to 120 seconds) depending on the statistical accuracy of the denominator. Thus, small deviations of the energy distribution that are caused by a remote source can trigger an energy ratio alarm based on the aforementioned calculation, while the count rate increase alone is too small or too slow to trigger a count alarm alone in embodiments of this invention. Conversely, conventional detection devices that only use count rates alone would trigger a false alarm in such circumstances. However, in situations of significant count rate increases (i.e., high energy radiation events), embodiments of the radiation measuring instrument 20 are able to detect a count alarm and quickly analyse this in terms of the energy ratio using a much shorter measuring time by deriving the dose rate value for the ratio calculation. Alternative embodiments can provide dose rate dependant alarm levels based on the counter rate ratio, such that different count and dose rate ratios can produce different types of alarms to indicate to the user the type of ratio that triggered the alarm. As an example, if a high count rate of low energy level particles triggered the alarm by producing a ratio that exceeds an acceptable threshold, the alarm signal can be different than if a low count rate of high energy particles triggered the ratio to exceed the acceptable threshold. In addition, other embodiments allow for variations such as suppression of ratio alarming at low dose rates, and so forth.

Returning to FIG. 1, the radiation measuring instrument 20, in one arrangement, is configured as a computerized device 150. A computer program product 152 includes an application or logic instructions that are loaded into the computerized device 152 to configure the device 150 to perform as a radiation measuring instrument 20.

In one arrangement, the controller 30 includes a memory 154 and a processor 156. The memory 154 can be of any type of volatile or non-volatile memory or storage system such as a computer memory (e.g., random access memory (RAM), read only memory (ROM), or another type of memory) disk memory, such as hard disk, floppy disk, optical disk, for example. The memory 154 is encoded with logic instructions and/or data that, in one embodiment of the computerized device 150, form a radiation measuring application configured according to embodiments of the radiation measuring instrument 20. In other words, the radiation measuring application represents software coding instructions and/or data that reside within the memory or storage 154, or within any computer readable medium accessible to the computer device 150.

The processor 156 represents any type of circuitry or processing device such as a central processing unit, controller, application specific integrated circuit, programmable gate array, or other circuitry that can access the radiation measuring application encoded within the memory 154 in order to run, execute, interpret, operate, or otherwise perform the radiation measuring application logic instructions. In other words, in another embodiment of the computer device 150, a radiation measuring process represents one or more portions of the logic instructions of the radiation measuring application while being executed or otherwise performed on, by, or in the processor 156 within the computerized device 150.

While this invention has been particularly shown and described with references to preferred embodiments thereof, it will be understood by those skilled in the art that various changes in form and details may be made therein without departing from the spirit and scope of the invention as defined by the appended claims.

For example, in one arrangement, the gamma radiation measuring instrument 20 includes a serial interface. The serial interface is configured to transmit data the calculated energy deviation result to an external peripheral device, such as a printer or a display for access by a user.

In FIG. 1, the counters 44 are illustrated as separate from the controller 30. Such illustration is by way of example only. In one arrangement, the pulse counters 44 are integrally formed as part of the controller 30.

As described above, with respect to FIG. 1, the detector 24 includes an "inorganic" scintillation (i.e., radiation detection) material, such as sodium iodide NaI(TI) material. Such description is by way of example only. In one arrangement, the detector 24 includes a proportional counter tube containing a gas, such as helium-3 (e.g., He-3) or boron trifluoride (e.g., BF3) sensitive to the detection of thermal neutrons. The plurality comparators 42, having differing energy thresholds, and corresponding counters 44, are in that case configured to discriminate neutron and gamma radiation. Neutrons interacting with the appropriate isotope in the counting gas (He-3 or B-10) deposit significantly more energy in the gas than gamma radiation dose. As such, the gamma radiation has relatively small pulses compared to the relatively large pulses of the neutron radiation. During operation, the radiation measuring instrument 20 discriminates the pulse height of the gamma radiation and the neutron radiation to discriminate neutron and gamma radiation. In the event that the count rate exceeds or rises above the high energy threshold, the radiation measuring instrument 20 distinguishes the radiation source as neutron radiation. As a result of distinguishing the radiation source as a neutron radiation source, the radiation measuring instrument 20 produces an alarm indicating the presence of neutron radiation. The radiation measuring instrument 20 derives the gamma counts from the count rate by referring to the lower threshold reduced by the count rate above the upper threshold to distinguish the radiation source as gamma radiation. As a result of distinguishing the radiation source as gamma radiation source, the radiation measuring instrument 20 produces an alarm indicating the presence of gamma radiation.

Conventional techniques for measuring both neutron and gamma radiation requires separate detectors for measurement of each type of radiation. Additionally, the conventional detectors only measure radiation within a single energy threshold. Inclusion of the proportional counter tube within the radiation measuring instrument 20 allows for manufacture of a relatively compact and lightweight instrument with a relatively low cost.

The following text refers to the version in which the detector is a scintillation detector:

With respect to FIG. 4, when the energy deviation result 134 falls outside of the threshold value range 126, the energy deviation result 134 is either greater than the first threshold value 136 or is less than the second threshold value 138. As a result of such deviation, the radiation measuring instrument 20 produces either an upper threshold alarm or a lower threshold alarm to indicate the presence of artificially occurring radiation. Such description is by way of example only. In one arrangement, the radiation measuring instrument 20 includes multiple upper threshold values and multiple lower threshold values. As the energy deviation result 134 approaches the multiple upper threshold values and the multiple lower threshold values, the radiation measuring instrument 20 generates a warning indicating a "higher than normal" presence of artificial radiation. For example, in FIG. 4, the threshold value range 135 for the radiation measuring instrument 20 includes a first or upper threshold value 136 of 2.0 and a second or lower threshold value 138 of 0.7. Assume that the radiation measuring instrument 20 also includes a sub-maximal threshold value of 1.9 and a sub-minimal threshold value of 0.8. In the event the radiation measuring instrument 20 calculates an energy deviation result 134 having a value of either 1.9 or 0.8, the radiation measuring instrument 20 generates a warning (e.g., flashing light, audible signal, etc.) indicating the "higher than normal" presence of artificial radiation.

What is claimed is:

1. A method for detecting a presence of artificial radiation comprising:
   measuring a plurality of radiation particle counts using a plurality of counters, each counter having a corresponding distinct energy threshold level;
   calculating a radiation dose rate based upon the radiation particle counts of the plurality of counters;
   comparing the radiation dose rate with the radiation particle counts from one of the plurality of counters to generate an energy deviation result, the energy deviation result indicating a presence of artificial radiation when the energy deviation result falls outside of a threshold value range, the threshold value range defined by a first threshold value and a second threshold value, the first threshold value greater than the second threshold value;
   wherein the step of comparing comprises forming a ratio of the radiation particle counts from one of the plurality of counters with the radiation dose rate to generate the energy deviation result; and
   wherein calculating the radiation dose rate comprises summing weighted radiation particle counts from each of the plurality of counters, weighting of the radiation particle counts for each of the plurality of counters based upon the energy threshold level associated with each of the plurality of counters.

2. The method of claim 1 comprising generating an alarm indicating the presence of artificial radiation when the energy deviation result falls outside of the threshold value range.

3. The method of claim 2 wherein generating an alarm comprises generating an upper threshold alarm indicating the presence of artificial radiation when the energy deviation result is greater than the first threshold value.

4. The method of claim 2 wherein generating an alarm comprises generating a lower threshold alarm indicating the presence of artificial radiation when the energy deviation result is less than the second threshold value.

5. A method for detecting a presence of artificial radiation comprising:
measuring a plurality of radiation particle counts using a plurality of counters, each counter having a corresponding distinct energy threshold level;
calculating a radiation dose rate based upon the radiation particle counts of the plurality of counters;
comparing the radiation dose rate with the radiation particle counts from one of the plurality of counters to generate an energy deviation result, the energy deviation result indicating a presence of artificial radiation when the energy deviation result falls outside of a threshold value range, the threshold value range defined by a first threshold value and a second threshold value, the first threshold value greater than the second threshold value;
wherein the step of comparing comprises forming a ratio of the radiation particle counts from one of the plurality of counters with the radiation dose rate to generate the energy deviation result;
comparing the distinct energy threshold levels of the plurality of counters to detect a counter having a low energy threshold level among the plurality of counters; and
when comparing the radiation dose rate, comparing the radiation dose rate with the radiation particle count from the counter having the low energy threshold level to generate the energy deviation result.

6. The method of claim 1 comprising, prior to measuring, detecting a presence of radiation particle using an inorganic scintillator.

7. The method of claim 1 comprising, prior to measuring, detecting a presence of both gamma radiation and thermal neutrons using a thermal neutron detection gas and pulse height discrimination of energy associated with the gamma radiation and energy associated with the thermal neutrons.

8. A radiation measuring instrument comprising:
a detector configured to detect a presence of radiation particles;
energy analysis circuitry in electrical communication with the detector, the energy analysis circuitry having a plurality of counters configured to measure a plurality of radiation particle counts from the detector, each counter having a corresponding, distinct energy threshold level; and
a controller in electrical communication with the energy analysis circuitry, the controller configured to:
calculate a radiation dose rate based upon the radiation particle counts of the plurality of counters; and
compare the radiation dose rate with the radiation particle counts from one of the plurality of counters to generate an energy deviation result, the energy deviation result formed as a ratio of the radiation particle counts from one of the plurality of counters with respect to the radiation dose rate, the energy deviation result indicating a presence of artificial radiation when the energy deviation result falls outside of a threshold value range, the threshold value range defined by a first threshold value and a second threshold value, the first threshold value greater than the second threshold value;
sum weighted radiation particle counts from each of the plurality of counters, weighting of the radiation particle counts for each of the plurality of counters based upon the energy threshold level associated with each of the plurality of counters.

9. The radiation measuring instrument of claim 8 wherein the controller is configured to generate an alarm indicating the presence of artificial radiation when the energy deviation result falls outside of the threshold value range.

10. The radiation measuring instrument of claim 9 wherein, when generating an alarm, the controller is configured to generate an upper threshold alarm indicating the presence of artificial radiation when the energy deviation result is greater than the first threshold value.

11. The radiation measuring instrument of claim 9 wherein, when generating an alarm, the controller is configured to generate a lower threshold alarm indicating the presence of artificial radiation when the energy deviation result is less than the second threshold value.

12. A radiation measuring instrument comprising:
a detector configured to detect a presence of radiation particles;
energy analysis circuitry in electrical communication with the detector, the energy analysis circuitry having a plurality of counters configured to measure a plurality of radiation particle counts from the detector, each counter having a corresponding, distinct energy threshold level; and
a controller in electrical communication with the energy analysis circuitry, the controller configured to:
calculate a radiation dose rate based upon the radiation particle counts of the plurality of counters;
compare the radiation dose rate with the radiation particle counts from one of the plurality of counters to generate an energy deviation result, the energy deviation result formed as a ratio of the radiation particle counts from one of the plurality of counters with respect to the radiation dose rate, the energy deviation result indicating a presence of artificial radiation when the energy deviation result falls outside of a threshold value range, the threshold value range defined by a first threshold value and a second threshold value, the first threshold value greater than the second threshold value;
compare the distinct energy threshold levels of the plurality of counters to detect a counter having a low energy threshold level among the plurality of counters; and
when comparing the radiation dose rate, compare the radiation dose rate with the radiation particle count from the counter having the low energy threshold level to generate the energy deviation result.

13. The radiation measuring instrument of claim 8 wherein the detector comprises an inorganic scintillator and a photomultiplier assembly configured to detect the presence of radiation particles.

14. The radiation measuring instrument of claim 8 wherein the plurality of counters comprises a first counter and a second counter, the first counter having an energy threshold level substantially equal to 30 keV and the second counter having an energy threshold level substantially equal to 200 keV.

15. The radiation measuring instrument of claim 14 wherein the plurality of counters further comprises a third counter having an energy threshold level substantially equal to 500 kev.

16. The radiation measuring instrument of claim 8 comprising a proportional counter having a thermal neutron detection gas, the proportional counter configured to detect a presence of both gamma radiation and thermal neutrons using the thermal neutron detection gas and pulse height discrimination of energy associated with the gamma radiation and energy associated with the thermal neutrons.

17. A tangible computer-readable medium including computer program logic stored thereon that, when performed on a computer system of a radiation measuring instrument, causes the computer system to:
receive a plurality of radiation particle counts from a plurality of counters, each counter having a corresponding, distinct energy threshold level to measure a presence of radiation in a respective energy range;
calculate a radiation dose rate based upon the radiation particle counts of the plurality of counters;
produce a first value by applying a first weighting factor to an amount of radiation detected in a first energy range of multiple different energy ranges monitored by the plurality of counters;
produce a second value by applying the second weighting factor to an amount of radiation detected in a second energy range of the multiple different energy ranges;
sum at least the first value and the second value to produce the radiation dose rate;
compare the radiation dose rate with the radiation particle counts from one of the plurality of counters to generate an energy deviation result, the energy deviation result being a ratio of the radiation particle counts from one of the plurality of counters with respect to the radiation dose rate; and
utilize the energy deviation result to indicate a presence of artificial radiation when the energy deviation result falls outside of a threshold value range defined by a first threshold value and a second threshold value, the first threshold value greater than the second threshold value.

18. A method for detecting a presence of artificial radiation comprising:
measuring a plurality of radiation particle counts using a plurality of counters, each counter having a corresponding distinct energy threshold level;
wherein measuring the plurality of radiation counts includes:
measuring a first amount of radiation above a first energy threshold value;
and measuring a second amount of radiation above a second energy threshold value different than the first energy threshold value;
calculating a radiation dose rate based upon the radiation particle counts of the plurality of counters;
wherein calculating the radiation dose rate includes producing the radiation dose rate based at least in part of the first amount of radiation and the second amount of radiation;
comparing the radiation dose rate with the radiation particle counts from one of the plurality of counters to generate an energy deviation result, the energy deviation result indicating a presence of artificial radiation when the energy deviation result falls outside of a threshold value range, the threshold value range defined by a first threshold value and a second threshold value, the first threshold value greater than the second threshold value; and
wherein comparing the radiation dose rate with the particle counts from one of the plurality of counters includes generating the energy deviation result as a ratio of the particle counts from one of the plurality of counters with respect to the calculated radiation dose rate, wherein generating the energy deviation result includes producing the energy deviation result based on a computation of dividing the first amount of radiation by the radiation dose rate;
wherein producing the radiation dose rate includes:
multiplying the first amount of measured radiation by a first energy weight value to produce a first weighted value;
multiplying the second amount of measured radiation by a second energy weight value to produce a second weighted value; and
summing at least the first weighted value and the second weighted value to produce the radiation dose rate, the method further comprising:
identifying when the energy deviation result falls outside of the threshold value range to signal the presence of the artificial radiation.

19. A method as in claim 18, wherein multiplying the first amount of measured radiation by the first energy weight value includes multiplying the first amount of measured radiation by the first energy threshold value to produce the first weighted value; and
multiplying the second amount of measured radiation by the second energy weight value includes multiplying the second amount of measured radiation by the second energy threshold value to produce the second weighted value.

20. A method comprising:
measuring a presence of radiation of each of multiple different energy ranges;
calculating a radiation dose rate based upon the presence of radiation in the multiple different energy ranges;
generating an energy deviation result as a ratio of an amount of measured radiation in one of the multiple different energy ranges relative to the calculated radiation dose rate; and
utilizing the energy deviation result to identify a presence of radiation above a naturally occurring background radiation level;
wherein calculating a radiation dose rate based upon the presence of radiation in each of the multiple different energy ranges includes:
producing a first value by applying a first weighting factor to an amount of radiation detected in a first energy range of the multiple different energy ranges;
producing a second value by applying a second weighting factor to an amount of radiation detected in a second energy range of the multiple different energy ranges; and
summing the first value and the second value to produce the radiation dose rate.

21. The method of claim 20, wherein utilizing the energy deviation result to identify the presence of artificial radiation above the naturally occurring background radiation level includes:
detecting whether the energy deviation result falls outside of a threshold value range defined by a first threshold value and a second threshold value, the first threshold value greater than the second threshold value.

22. The method as in claim 21, wherein generating the energy deviation result includes:
dividing the amount of energy detected in the first energy range by the radiation dose rate.

23. The method as in claim 20, wherein generating the energy deviation result includes generating the ratio based on a first value divided by a second value, the first value representing the measured radiation detected in the one of the multiple different energy ranges, the second value representing a measurement of the presence of radiation in the multiple different energy ranges.

24. The method as in claim 20, wherein calculating the radiation dose rate includes generating a first value representative of the presence of radiation in the multiple different energy ranges; and wherein generating the energy deviation result as the ratio includes:
dividing a second value by a first value, the second value representing the amount of measured radiation in the one of multiple different energy ranges.

* * * * *

UNITED STATES PATENT AND TRADEMARK OFFICE
CERTIFICATE OF CORRECTION

PATENT NO. : 7,456,405 B1  Page 1 of 1
APPLICATION NO. : 11/076409
DATED : November 25, 2008
INVENTOR(S) : Michael Iwatschenko-Borho et al.

It is certified that error appears in the above-identified patent and that said Letters Patent is hereby corrected as shown below:

Claim 22, Column 16, Line 60, "The method as in claim 21" should read -- The method as in claim 20 --.

Signed and Sealed this

Seventeenth Day of March, 2009

JOHN DOLL
*Acting Director of the United States Patent and Trademark Office*